United States Patent [19]

Szycher

[11] 4,131,604
[45] Dec. 26, 1978

[54] POLYURETHANE ELASTOMER FOR HEART ASSIST DEVICES

[75] Inventor: Michael Szycher, Peabody, Mass.

[73] Assignee: Thermo Electron Corporation, Waltham, Mass.

[21] Appl. No.: 854,274

[22] Filed: Nov. 23, 1977

[51] Int. Cl.² ............................................. C08G 18/48
[52] U.S. Cl. ............................................. 528/79; 3/1;
 3/1.7; 128/1 D; 264/311; 264/328; 528/76; 528/65
[58] Field of Search .................... 3/1, 1.7; 128/1 D;
 264/311, 328; 260/77.5 AP, 77.5 AM

[56] References Cited

U.S. PATENT DOCUMENTS

| | | | |
|---|---|---|---|
| 2,808,391 | 10/1957 | Pattison | 260/77.5 AM |
| 2,808,967 | 10/1957 | Miller | 264/311 |
| 2,865,940 | 12/1958 | Nobis et al. | 260/77.5 AT |
| 2,866,774 | 12/1958 | Price | 260/77.5 AP |
| 2,899,411 | 8/1959 | Schollenberger | 260/77.5 AP |
| 2,929,800 | 3/1960 | Hill | 260/77.5 AP |
| 2,948,691 | 8/1960 | Windemuth et al. | 260/77.5 AP |
| 3,130,175 | 4/1964 | Peter et al. | 260/77.5 AM |
| 3,487,050 | 12/1969 | Castro et al. | 260/77.5 AT |
| 3,512,183 | 5/1970 | Sharp et al. | 3/1 D |
| 3,562,352 | 2/1971 | Nyilas | 3/1.7 |
| 3,604,016 | 9/1971 | Robinson et al. | 3/1 AH |
| 3,746,683 | 7/1973 | Salyer et al. | 260/77.5 AP |
| 3,798,200 | 3/1974 | Kancko et al. | 260/77.5 AM |
| 3,804,812 | 4/1974 | Koroscil | 260/77.5 AM |
| 3,939,021 | 2/1976 | Nishibayashi et al. | 260/77.5 AT |

*Primary Examiner*—M. J. Welsh
*Attorney, Agent, or Firm*—Kenway & Jenney

[57] ABSTRACT

Rubbery reaction products of an aliphatic organic diisocyanate, a high molecular weight polyether polyol (poly tetra methylene ether glycol), a low molecular weight glycol chain extender and a polyhydic alcohol crossliker such as trimethylol propane. The resulting polymers have improved thromboresistant properties and a long flexural life.

Bladders for heart pumps may be formed from the resulting polymer, and a novel process for forming bladders for heart pumps is disclosed.

22 Claims, 2 Drawing Figures

POLYURETHANE ELASTOMER FOR HEART ASSIST DEVICES

BACKGROUND OF THE INVENTION

Many traumatic or pathological cardiac conditions can be corrected, or at least partially compensated for, by providing a pneumatically or hydraulically activated pump to supplement the function of the compromised heart and assist in maintaining normal blood perfusion. Significant advances have been made in recent years in the development of such vascular prosthesis. The main problem encountered by those working in this field concerns the complicated processes occurring at the blood-graft-interface. It has been found that the addition of a foreign material to the blood stream usually results in the formation of a blood clot on the surface of that material, leading to thromboembolic complications and death.

One form of heart-assist system that has been proposed comprises a diaphragm type pump adapted to be surgically implanted and connected in series between the left ventricle and descending aorta. The left ventricle is chosen because it performs approximately 83 percent of the work done by the heart on the blood stream. This type of blood pump is shown schematically in FIG. 1. However, for more complete details of a blood pump of the type shown in FIG. 1, see U.S. Pat. No. 3,604,016 to Robinson et at., entitled MULTIPLE FUNCTION BLOOD COUPLER, the teachings of which are incorporated herein by reference.

As is shown in FIG. 1, the blood pump 10 typically comprises an outer housing 12 of titanium or other suitable metal provided with an outlet passage 14 adapted to be grafted onto the aorta. An inlet passage 16 is designed to be secured to the left ventricle. The pump 10 is provided with inlet and outlet check valves 18, 20 to control the flow to and from the pump. A flexible tube 22 connects the housing 12 to the pump control unit (not shown).

A thin, flexible polyurethane bladder 24 is contained within the housing 12. The elastomer of the present invention is employed to great advantage in forming this bladder 24 (or bladder 51 of the pump shown in U.S. Pat. No. 3,604,016). The bladder 24 wall thickness can vary between 0.020 inch and 0.050 inch, but preferably is between 0.025 and 0.030 inch, since at this thickness the material is still highly flexible, yet retains a safe margin of strength.

The blood contacting surfaces of all parts, including the hardware as well as the polyurethane blood pump itself are preferably coated with a surface which encourages the formation of an intimal lining. This coating can be formed by flocking with a matted coat of dacron fibrils, in the manner known in the art. Although the interior surface of the bladder is customarily flocked with dacron fibrils to encourage formation of an autologous pseudoendothelial surface intraimplant, the polyurethane material of this invention is not necessarily restricted to this configuration. Indeed, all the physical and biological properties of the elastomer of the present invention are obtained from smooth molded films.

As should be apparent, the bladder 24 must be formed of a material that meets a number of criteria. For example, the material from which the bladder 24 is formed must be capable of continuously flexing without breaking. If the bladder is to be used in an artificial heart, the bladder would have to flex continuously without interruption for a minimum of one year. During this period of time, the bladder would undergo about 40,000,000 flexes. In addition to being able to exhibit the ability to flex continuously without breaking, the material from which the bladder is fabricated must be hemo-compatible. That is, the material should not induce the formation of a thrombus which can migrate into the peripheral blood stream; and lastly, the raw materials from which the bladder is made cannot be toxic.

There are several materials on the market which are being used, at least experimentally, as a bladder material. These materials are polyurethane based. However, these known prior art polyurethane based bladder materials suffer from a number of deficiencies. The most significant definciency of these materials is the result of the manufacturing techniques used when employing these polyurethane materials to form a bladder. The prior art polyurethane based bladder materials are used in a solvated liquid. To form a bladder, a form is dipped into the solvated polyurethane liquid and the form is withdrawn. Thereafter, the solvent is evaporated. This procedure is repeated until the polyurethane material has built up to the desired thickness. Thus, a multiple series of dipping and withdrawals is involved in order to obtain a bladder.

In contradistinction to the foregoing procedure, the procedure by which the bladder of the present invention is made involves no solvent. The constituents of the elastomer are 100% non-volatile. The polymer is formed by mixing the constituents together and pouring the constituents into a mold. The desired thickness of the bladder is determined by the thickness of the mold.

SUMMARY OF THE INVENTION

This invention relates to a family of polyurethane elastomers specifically developed for use in cardiac assist devices. The polymers can be characterized as essentially linear, segmented, castable aliphatic polyurethane elastomers. This family of polymers, being aliphatic and polyether-based with 100% urethane linkages in the molecular backbone, exhibit superior flexural life, outstanding hydrolytic stability, and a high degree of blood compatibility. This unusual combination of properties make this family of polymers useful in devices requiring blood contact surfaces intended for human implantation.

It is therefore an object of this invention to provide a superior material suitable for use as a cardiovascular prosthesis.

Another object of this invention is to provide elastomeric polymerization products of polyols and glycols with diisocyanates having long pot lives; said pot lives resulting in an improved reliability of processing and manufacturing heretofore unattainable in customary solvent-based systems.

Yet another object of the invention is to provide a process for making a blood pump bladder by pouring the constituents of a polyurethane elastomer into a mold of desired thickness to form the bladder.

DESCRIPTION OF THE PREFERRED EMBODIMENT

Figure 1:
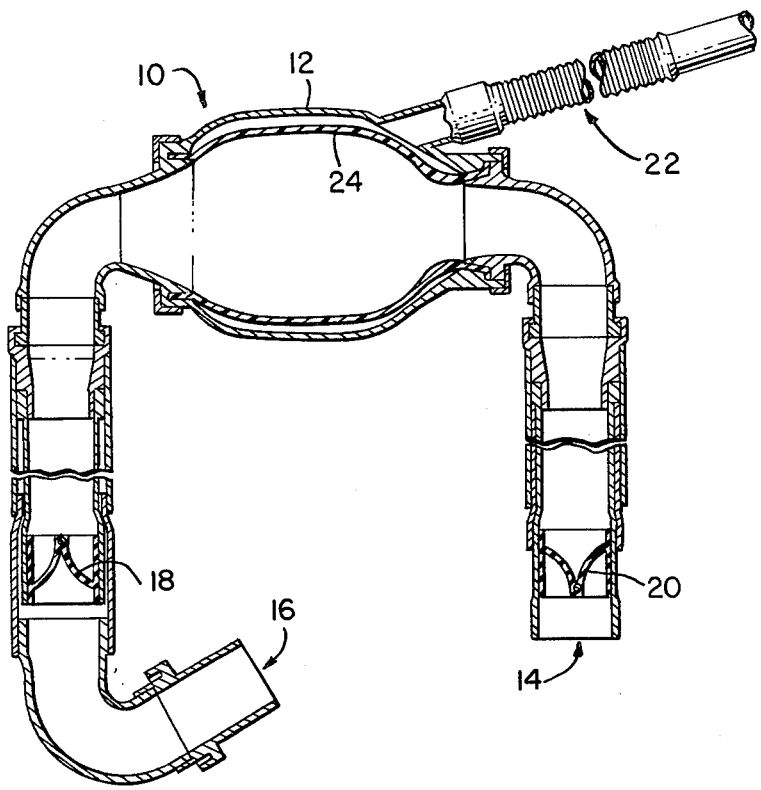
FIG. 1 is a schematic view of a blood pump of the type in which a bladder formed in accordance with the present invention can be employed to great advantage.

At the outset, the invention is described in its broadest overall aspects with a more detailed description following. The polyurethane elastomer of the present invention is a rubbery reaction product of aliphatic organic diisocyanates, high molecular weight polyether polyols, low molecular weight glycols (chain extenders) and low molecular weight trihydric alcohols(crosslinkers).

In general, polyurethane polymers are the condensation product of reactions between diisocyanates and compounds containing active hydrogen sites such as hydroxyl groups.

A diisocyanate is an isocyanate compound having a functionality of two. The polymerization takes place in the presence of a difunctional hydroxyl compound (this can be either a simple glycol or a macromolecular glycol).

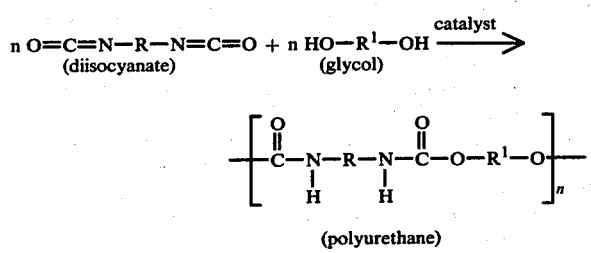

Examples of aliphatic diisocyanates useful in this invention are: hexamethylene diisocyanate (HDI), OCN $(CH_2)_6$NCO; isophorone diisocyanate (IPDI),

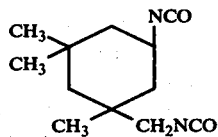

tri methyl hexamethylene diisocyanate (TMHDI),

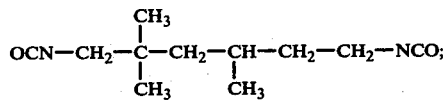

dicylohexyl methane diisocyanate (HMDI), $CH_2(C_6H_{10}NCO)_2$,

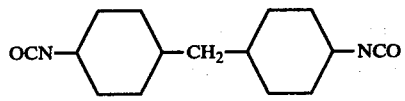

and dimer acid diisocyanate (DDI)

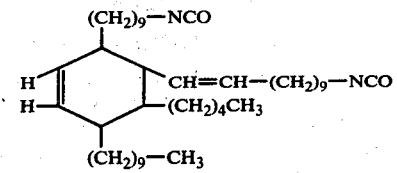

The preferred diisocyanate for forming a bladder in accordance with this invention is dicyclohexyl methane diisocyanate (HMDI).

Although a number of aliphatic diisocyanates can be utilized in preparing a polymer for forming bladders in accordance with the present invention, numerous tests have indicated that the selection of the high molecular weight polyol is limited to poly tetra methylene ether glycol (PTMEG) $H-(O-CH_2-CH_2-CH_2-CH_2)_n-OH$. Stated another way, this high molecular polyol is the only polyol which has been found to produce a polyurethane which is hemocompatible and possesses the other properties discussed above. In general, this glycol should have an average molecular weight between about 500 and 5000, preferably between 1000 and 3000. In the preferred embodiment of this invention PTMEG having a molecular weight of 1500 is utilized.

Examples of chain extenders (low molecular weight glycols) applicable to this invention include propylene glycol, dipropylene glycol, ethylene glycol, diethylene glycol, neopentyl glycol and cyclohexane dimethanol $C_6H_{10}(CH_2OH)_2$. For greater flexural life, cyclohexane dimethanol (CHDM) is preferred. The low molecular weight glycol should have a molecular weight between the range of 80 to 300.

Pure polyurethane elastomers exhibit a characteristic surface viscosity which results in high coefficients of friction. High coefficients of friction in turn reduce the useful abrasive life of the film. For this reason it is customary to add small amounts of a low molecular weight polyhydric alcohol (crosslinker) to the composition in order to reduce surface friction. It is emphasized, however, that improved urethane elastomers are possible by utilizing the constituents set forth above without such a crosslinker. However, elastomers with crosslinkers are preferred. To be useable as a crosslinker, the polyhydric alcohol must be trihydric or higher. Suitable trihydric alcohols include glycerol, pentaerythritol, trimethylolethane, trimethylolpropane, mannitol and the like. The preferred trihydric alcohol is trimethylolpropane.

The preferred polyurethane has the following structural formula:

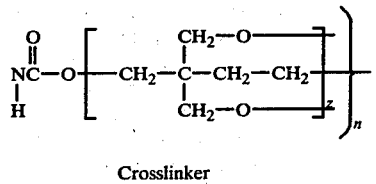

Crosslinker (TMP)

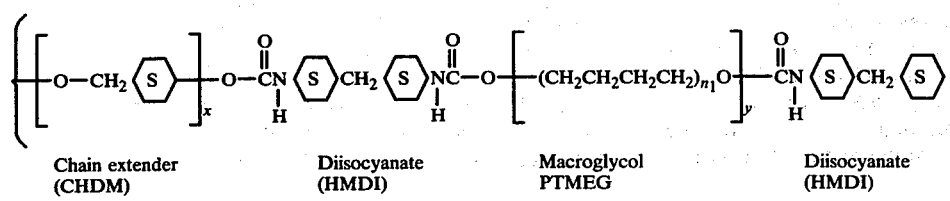

Chain extender (CHDM)    Diisocyanate (HMDI)    Macroglycol PTMEG    Diisocyanate (HMDI)

where x, y and z are any positive integers between 1 and 4. The reactants are provided in approximately the molar amounts necessary to produce the foregoing polymer. The foregoing polymer preferably has a molecular weight between the range of 80–120 thousand molecular weight units.

To obtain fully cured polyurethane castings in a reasonably short period of time, it is customary to incorporate into the mixture a suitable catalyst to promote the polymerization reaction. Suitable catalysts include N-methyl morpholine, trimethyl amine, triethyl amine, zinc octoate, and dibutyl tin dilaurate. Dibutyl tin dilaurate is the preferred catalyst.

Figure 2:
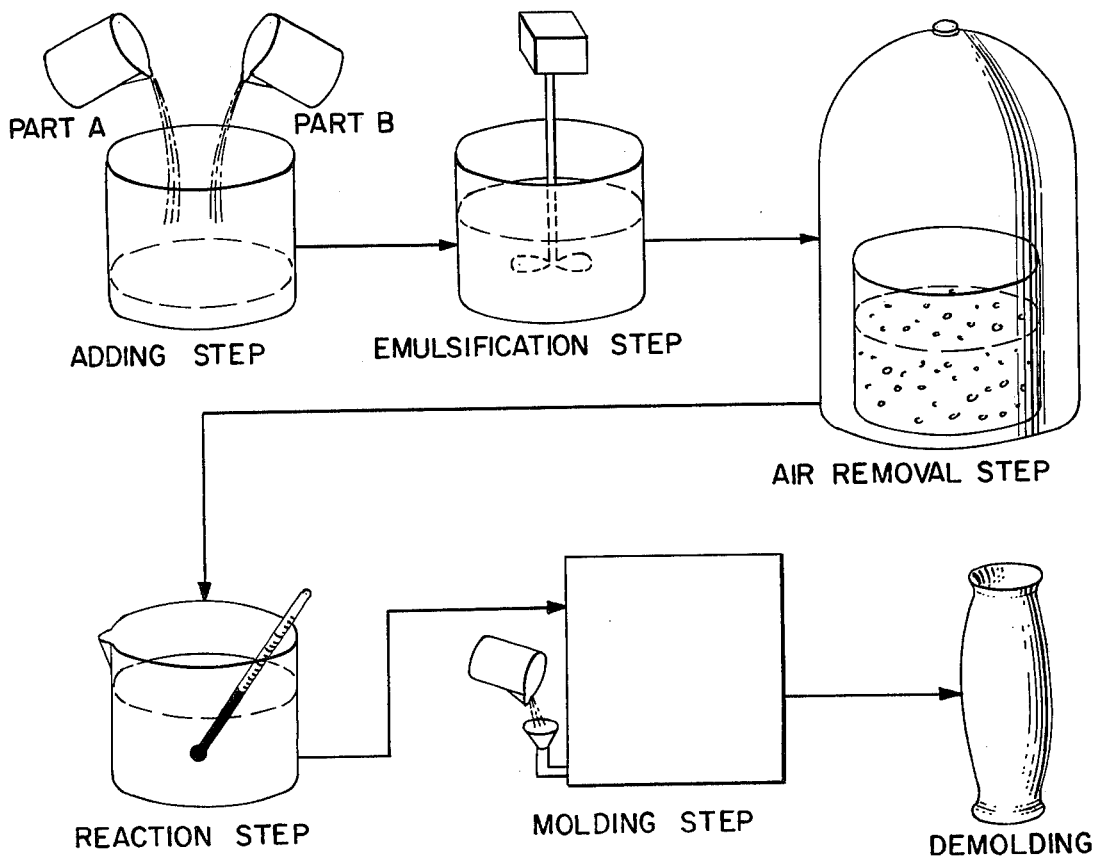
FIG. 2 is a diagram illustrating the process in accordance with the present invention for molding articles from the elastomer of the present invention.

The process for molding bladders in accordance with the present invention is represented diagrammatically in FIG. 2. In one important embodiment of the present invention, the polyurethane is prepared from two components which can be referred to as part A and part B. Part A is the aliphatic diisocyanate. Part B is comprised of four constituents: a macroglycol (the polyether base), the low molecular weight chain extender, the cross linker and the catalyst. To form a polyurethane molded element, the proper stoichiometric proportions of part A and part B are emulsified by a mixer at room temperature to form a moderately reactive thixotropic mixture having a viscocity below about 2500 cps. This two part procedure is further illustrated by the examples below entitled "ONE SHOT TECHNIQUE".

Since the emulsification introduces air into the reactive mixture, the air must be removed. The air bubbles are removed by placing a vessel containing the emulsion under a bell jar and evacuating the air from the bell jar with a suction device. The bell jar is evacuated to a pressure of about 0.3 microns and the mixture is kept under the bell jar about 8 minutes causing the mixture to appear to boil. After the emulsion is taken from the bell jar, it is allowed to stand until the exothermic reaction that is taking place brings it to a temperature of about 40° C. At that point, the emulsion is forced into a mold.

It is preferred to force the emulsion from the bottom to the top of the mold by the use of a pressurizing gas such as dry nitrogen. After the mold is filled, it is placed in an oven and heated at a temperature of at least 110° C. for four hours or more until the elastomer is cured. The mold is then removed from the oven, allowed to reach room temperature, and the bladder is demolded. After the bladder is removed from the mold, the inner surfaces of the bladder are lined with flock. The purpose of the flock is to provide an anchoring network to form a vascular lining. The flock is precision machine cut dacron, which is formed from fibers 10,000th of an inch in length by 1,000th of an inch in diameter. The flock is cemented to the inside of the bladder with a polyurethane adhesive of the same composition as the bladder wall. The adhesive is sprayed inside the bladder and the flock is sprayed onto the adhesive and allowed to cure. Flocking is, of course, a conventional procedure in this art.

At this point it should be noted that the foregoing procedure has many advantages over the prior art procedure. As has been stated above, in the prior art processing, the bladder is formed by repeatedly dipping a suitable form into a liquid and then evaporating the solvent. In such a process, however, each time the form is dipped, the possibility of air entrapment is increased. Furthermore, with the dipping procedure, it takes several days to form a bladder; whereas with the procedure described above, a finished bladder is produced in about four hours.

More specific aspects of the invention are illustrated by the following non-limiting examples, wherein parts are given by weight. A series of aliphatic polyether urethanes can be prepared with varying tensile strengths. The tensile strength is controlled by the amount of chain extender, as well as the molecular weight of the polyether diol. The examples which follow represent two distinct manufacturing techniques, namely, the one shot bulk polymerization technique, and the prepolymer extension technique.

In handling polyurethanes in the form of reactive liquids, one of the most important requirements is that all water and moisture be kept away from the system until the elastomer is fully cured. Routinely, then, all reactive monomers and prepolymers used in these examples were vacuum degassed to remove volatile products. The degassing technique required that the vacuum be applied slowly to avoid foaming.

EXAMPLE I

ONE SHOT TECHNIQUE

A blend of poly tetra methylene ether glycol, molecular weight 1250, and cyclohexane dimethanol is heated to 35° C. and degassed for several minutes. Mixing ratio by weight is 65.2 grams of polyether to 7.3 grams of diol. To insure proper cure, 0.015 grams of dibutyl tin dilaurate are added to 100 grams of resin. To this blend is charged 27.5 grams of dicyclohexyl methane diisocyanate, and both materials are intimately emulsified by mixing for three minutes. This is followed by a second degassing step to remove any entrapped air in the blend.

The batch is poured into a suitable mold, and cured at 110° C. for four hours. This results in a highly elastomeric polymer with the following physical properties: 1200 psi ultimate tensile strength; 930% elongation, and a Shore A hardness of 65.

EXAMPLE 2

ONE SHOT TECHNIQUE

Following the procedure of Example 1: blend 65.1 grams of poly tetra methylene ether glycol of 1250 m.w.; 6.8 grams of cyclohexane dimethanol; 0.3 grams of trimethylolpropane and 0.015 grams of dibutyl tin dilaurate. Then add 27.7 grams of dicyclohexyl methane diisocyanate. After proper degassing and curing, this mixture yields a polymer with the following enhanced physical properties: 1350 psi tensile strength, 575% elongation, Shore A 65.

EXAMPLE 3

ONE SHOT TECHNIQUE

Following the procedure of Example 1: blend 68.8 grams PTMEG 1500 m.w.; 5.5 grams of cyclohexane dimethanol; 0.7 grams of trimethylolpropane and 0.015 grams of dibutyl tin dilaurate. Then add 25.0 grams of dicyclohexyl methane diisocyanate. After proper degassing and curing, this mixture yields a polymer with the following physical properties: 1780 psi tensile strength, 620% elongation and a Shore A hardness of 65.

EXAMPLE 4

PREPOLYMER TECHNIQUE 26.04 grams of dicyclohexyl methane diisocyanate is charged into a four neck reaction flask which has been purged with dry nitrogen. The contents of the flask are held under a nitrogen stream and 73.96 grams of PTMEG (1500 m.w.) which had been previously dried is charged into the flask. The PTMEG is added slowly to the isocyanate to promote capping rather than extension. After all the PTMEG has been charged, 0.015 grams of dibutyl tin dilaurate is added.

The mixture is held at 80° C. under continuous agitation for four hours or until a theoretical NCO percentage of 4.1 ± 0.1 has been reached. The prepolymer is then allowed to cool to room temperature and packed under a nitrogen blanket. Prior to chain extension, the prepolymer is reheated to 85° C. and deairated. Then 6.89 grams of cyclohexane dimethanol is charged and mixed intimately; again the mixture is deairated. This is followed by pouring into a mold, and curing for eight hours at 110° C. Typical properties are: 1300 psi tensile strength, 900% elongation and 65 Shore A hardness.

EXAMPLE 5
PREPOLYMER TECHNIQUE

Following the procedure of Example 4, 29.75 grams of dicyclohexyl methane diisocyanate are charged into a reactor. Then, 0.32 grams of trimethylolpropane is charged and reacted. Upon completion of the reaction, 69.92 grams PTMEG is charged slowly and reacted after the addition of 0.015 grams of dibutyl tin dilaurate. The prepolymer is then extended with 0.73 grams of cyclohexane dimethanol. Typical physical properties are: 1400 psi tensile strength, 600% elongation and 65 Shore A hardness.

EXAMPLE 6
PREPOLYMER TECHNIQUE

Following the procedure of Example 4, the prepolymer consists of 26.45 grams of dicyclohexylmethane diisocyanate; 0.74 grams of trimethylolpropane; 72.80 grams of PTMEG (1500 m.w.); 0.015 grams of dibutyl tin dilaurate. The prepolymer is extended with 6.06 grams of cyclohexane dimethanol. The curing cycle is eight hours at 110° C. Typical physical properties: 1900 psi tensile strength; 700% elongation and 65 Shore A hardness.

To determine the degree of blood compatibility, the polymer of Example 3 was submitted to the Cleveland Clinic Foundation, Department of Artificial Organs, to be subjected to the "Kinetic Clotting Index" developed by the Clinic. The result is as follows:

| Sample | Kinetic Clotting Index | |
| --- | --- | --- |
|  | Direct | Indirect |
| Example 3 | −22.9 | +14.6 |
| Competitive Urethane (Biomer) | −16.0 | + 9.2 |

In this procedure, the more negative the Direct Test, and the more positive the Indirect Test the greater the blood compatibility of the biomaterial. As can be seen from the above table, the test parameters of the elastomer obtained from Example 3 are substantially better than those of a commercially available urethane (Biomer, Ethicon, Inc., Somerville, N.J.).

Two bladders formed from the polymer of Example 3 were tested for flex life. In this test, the bladders were subjected to over 60 million flexes without any failure. As of the time of the writing of this specification, those bladders were still being continuously flexed without failure.

The invention may be embodied in other specific forms without departing from the spirit and essential characteristics thereof. The foregoing embodiments are therefore intended to be illustrative and not restrictive, the scope of the invention being indicated by the appended claims rather than by the foregoing description, and all changes which come within the meaning and range of equivalency of the claims are therefore intended to be embraced therein.

I claim:

1. A bladder for devices intended for implantation in a human said bladder being characterized in that it is formed from an aliphatic polyurethane elastomer said polyurethane elastomer being the reaction product of:
   (1) dicyclohexyl methane diisocyanate;
   (2) poly tetra methylene ether glycol having a molecular weight between the range of 500–5,000;
   (3) a low molecular weight glycol selected from the group consisting of propylene glycol, dipropylene glycol ethylene glycol, diethylene glycol, neopentyl glycol and cyclohexane dimethanol, and
   (4) a trihydric alcohol crosslinker, said trihydric alcohol being selected from the group consisting of glycerol, pentaerythritol, trimethylolethane, trimethylolpropane, and mannitol said polyurethane elastomer having a molecular weight within the range of 80–120 thousand molecular weight units.

2. The bladder as set forth in claim 1 wherein said low molecular weight glycol is cyclohexane dimethanol.

3. The bladder as set forth in claim 1 wherein the molecular weight of the poly tetra methylene ether glycol is between the range of 1,000 to 3,000 molecular weight units.

4. The bladder as set forth in claim 2 wherein the molecular weight of the poly tetra methylene ether glycol is between the range of 1,000 to 3,000 molecular weight units.

5. The bladder as set forth in claim 1 wherein said trihydric alcohol is trimethylolpropane.

6. The bladder as set forth in claim 2 wherein said trihydric alcohol is trimethyolpropane.

7. The bladder as set forth in claim 3 wherein said trihydric alcohol is trimethylolpropane.

8. The bladder as set forth in claim 4 wherein said trihydric alcohol is trimethylolpropane.

9. A polyurethane elastomer, said polyurethane elastomer being the reaction product of:
   (1) an aliphatic diisocyanate selected from the group consisting of hexamethylene diisocyanate, isophorone diisocyanate, trimethyl hexamethylene diisocyanate, dicyclohexyl methane diisocyanate, and dimer acid diisocyanate; p1 (2) cyclohexane dimethanol; and
   (3) a poly tetra methylene ether polyol having a molecular weight in the range of 500–5000 molecular weight units, the resulting polymer having a molecular weight between the range of 80–120 thousand molecular units.

10. The polyurethane elastomer as set forth in claim 9 wherein said aliphatic diisocyanate is dicyclohexyl methane diisocyanate.

11. The polyurethane elastomer as set forth in claim 10 wherein the molecular weight of said poly tetra methylene ether polyol is between the range of 1000–3000.

12. A polyurethane elastomer, said polyurethane elastomer being the reaction product of:

(1) an aliphatic diisocyanate selected from the group consisting of hexamethylene diisocyanate, isophorone diisocyanate, trimethyl hexamethylene diisocyanate, dicyclohexyl methane diisocyanate, and dimer acid diisocyanate;

(2) cyclohexane dimethanol;

(3) a poly tetra methylene ether polyol having a molecular weight in the range of 500-5000 molecular weight units, and (4) a trihydric alcohol crosslinker, said trihydric alcohol being selected from the group consisting of glycerol, pentaerythritol, trimethylolethane, trimethylolethane, trimethylolpropane, and mannitol.

neopentyl glycol, and cyclohexane dimethanol, and 4. a trihydric alcohol crosslinker, said trihydric alcohol being selected from the group consisting of glycerol, pentaerythritol, trimethylolethane, trimethylolpropane, and mannitol;

B. mixing the reactants to form a reactive mixture

C. degassing the reactive mixture to remove entrained air

D. forcing the reactive mixture into a mold having a configuration of a bladder

E. curing the mixture in the mold to form a polyurethane elastomer, and

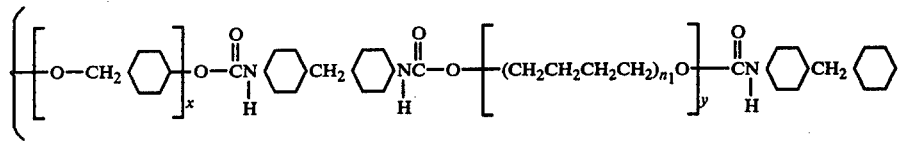

13. The polyurethane elastomer as set forth in claim 12 wherein said aliphatic diisocyanate is dicyclohexyl methane diisocyanate.

14. The polyurethane elastomer as set forth in claim 13 wherein the molecular weight of said poly tetra methylene ether polyol is between the range of 1000-3000.

15. The elastomer as set forth in claim 12 wherein the trihydric alcohol is trimethylolpropane.

16. The elastomer as set forth in claim 13 wherein the trihydric alcohol is trimethylolpropane.

17. The elastomer as set forth in claim 14 wherein the trihydric alcohol is trimethylolpropane.

18. A process for forming a bladder for use in devices intended for chronic human implantation comprising the following steps:

A. providing reactants comprising 1. a diisocyanate selected from the group consisting of hexamethylene diisocyanate, trimethyl hexamethylene diisocyanate, dicyclohexyl methane diisocyanate and dimer acid diisocyanate;

2. poly tetra methylene ether glycol having a molecular weight within a range of 500-5000 molecular weight units, 3. a low molecular weight glycol selected from the group consisting of propylene glycol, dipropylene glycol, ethylene glycol, diethylene glycol, F. removing the bladder from the mold.

19. The process as set forth in claim 18 wherein in step E the mixture is cured in the mold by being heated to at least 110° C. for at least four hours.

20. A polyurethane elastomer having the following formula

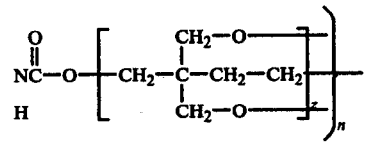

where x, y and z are any positive integers between 1 and 4, the molecular weight of $[(CH_2CH_2CH_2CH_2)n_1]$ is between the range of 500-5000 and the molecular weight of the elastomer is between the range of 80,000-120,000.

21. The process as set forth in claim 18 wherein in step A-3 the low molecular weight glycol that is provided is cyclohexane dimethanol.

22. The process as set forth in claim 21 wherein in step A-1 the diisocyanate provided is dicyclohexyl methane diisocyanate.

* * * * *